United States Patent
Richards

(10) Patent No.: US 6,471,517 B2
(45) Date of Patent: Oct. 29, 2002

(54) READING TEACHING AID

(76) Inventor: John Michael Richards, Spike Lodge, The Street, East Preston, Littlehapmton, BN16 1JL (GB)

( * ) Notice: Subject to any disclaimer, the term of this patent is extended or adjusted under 35 U.S.C. 154(b) by 0 days.

(21) Appl. No.: 09/760,643

(22) Filed: Jan. 17, 2001

(65) Prior Publication Data

US 2001/0008754 A1 Jul. 19, 2001

(30) Foreign Application Priority Data

Jan. 17, 2000 (GB) .............................................. 0001029

(51) Int. Cl.⁷ .............................................. G09B 17/02
(52) U.S. Cl. ........................ 434/178; 434/179; 434/181
(58) Field of Search ................................ 434/178, 179, 434/181

(56) References Cited

U.S. PATENT DOCUMENTS

| | | | | |
|---|---|---|---|---|
| D244,091 S | * | 4/1977 | Bryant | |
| 4,016,659 A | * | 4/1977 | Merrigan | |
| 4,055,908 A | * | 11/1977 | Greene | |
| 4,212,305 A | * | 7/1980 | Lahay | |
| 4,452,106 A | * | 6/1984 | Tartaglia | |
| 4,720,921 A | * | 1/1988 | Beaudry | |
| 5,060,329 A | * | 10/1991 | Hudson | |
| D356,114 S | * | 3/1995 | Chang | |
| 5,591,033 A | * | 1/1997 | Levine | |
| 5,763,781 A | * | 6/1998 | Netzer | |
| 5,800,256 A | * | 9/1998 | Bermudez | |
| 5,894,671 A | * | 4/1999 | Karapetian | |
| 6,131,978 A | * | 10/2000 | Rounds | |

FOREIGN PATENT DOCUMENTS

| | | | |
|---|---|---|---|
| GB | 2114514 | * | 8/1983 |
| GB | 2 297 186 B | | 7/1996 |

\* cited by examiner

*Primary Examiner*—Derris H. Banks
*Assistant Examiner*—Dmitry Suhol
(74) *Attorney, Agent, or Firm*—Diller, Ramik & Wight

(57) ABSTRACT

A reading teaching aid comprising two substantially coplanar masking elements each of which defines at least one edge of a viewing area, said elements being carried on the respective first ends of a pair of elongate arms which are resiliently hinged together at their second ends, each of said elongate arms having finger reception means adjacent said masking elements which include a substantially horizontal portion and an upstanding portion to allow said masking elements to be pressed onto a supporting surface and moved towards and away from each other against the resilience of the hinge to vary the dimensions of the viewing area.

17 Claims, 2 Drawing Sheets

READING TEACHING AID

BACKGROUND OF THE INVENTION

This invention relates to a teaching aid and comprises a device for assisting in the learning of reading.

When teaching reading it is often advantageous for the pupil to point at words which are recognised. Teachers assisting the pupil often follow the words with a pointer or finger in order to emphasize the correct reading direction and to focus attention of the point to which progress has been made. It is also a common practice to place a straight edge or rule in such a position that the line of words to be read appears adjacent the straight edge (line tracking).

When longer words are encountered, it is often advantageous for the pupil if these can be broken up into pronounceable syllables. To achieve this it is the teacher's aim to obscure parts of the longer word in order to focus attention on particular syllables in sequence. However, when this is done using the teacher's fingers, it is extremely difficult not to obscure more of the text than is required to be covered. The teacher's hands and/forearms often obscure parts of the text which the pupil is intended to be reading.

In the present Applicant's UK patent GB 2 297 186 a teaching aid is described which is simple to use and can accurately obscure parts of a written text in order to focus the pupil's attention on particular words or syllables.

There have however been difficulties in accurately operating the device and it has been found that the masking elements can be easily obscured by the operator, that is the pupil's or the teacher's fingers. There has also been difficulties in opening and closing the device due to its particular construction.

SUMMARY OF THE INVENTION

The present invention is intended to overcome some of the difficulties referred to above by providing a particular position for the user's fingers which ensures that they do not obscure the masking elements and making the device easy to operate.

According to the present invention a reading teaching aid comprises two substantially coplanar masking elements each of which defines at least one edge of a viewing area, said elements being carried on the respective first ends of a pair of elongate arms which are resiliently hinged together at their second ends, each of said elongate arms having finger reception means adjacent said masking elements which include a substantially horizontal portion and an upstanding portion to allow said masking elements to be pressed onto a supporting surface and moved towards and away from each other against the resilience of the hinge to vary the dimensions of the viewing area.

The finger reception means can also be arranged to act as stop means to limit the inward movement of the masking elements and thus prevent them from overlapping.

Preferably the substantially horizontal part of each of the finger reception means is on the side of the interconnecting arms which is adjacent the other arm.

In a preferred construction the arms are of a substantial "L" shaped cross-section in the area of the finger reception means.

The arms can be connected together by the resilient hinge which is formed by an interconnecting extension of the upstanding portions of the L-shaped parts of the arms.

Each of the masking elements can be substantially rectangular or square in plan view and they can be tinted.

In order to make the device more attractive to children it can be decorated and/or shaped to represent a natural or fictional character. Thus, the elongate arms can be decorated or shaped to The masking elements could also be decorated and/or shaped to represent paws or feet at the distal end of the arms.

The creature can be human, animal, fish, insect or alien or imaginary creature.

The invention can be performed in various ways but one embodiment will now be described by way of example and with reference to the accompany drawings in which:

BRIEF DESCRIPTIONS OF THE DRAWINGS

FIG. 1. is a side view of the reading teaching aid according to the invention;

DESCRIPTION OF THE PREFERRED EMBODIMENTS

Figure 1:
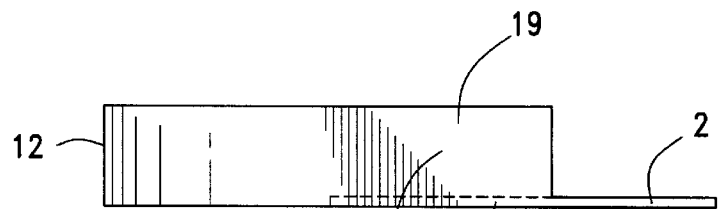

As shown in the drawings, the reading teaching aid according to the invention comprises two substantially coplanar rectangular masking elements 1 and 2 which have respective edges 3 and 4 which define the edges of a viewing area indicated by arrow 5 which is between the edges. The masking elements 1 and 2 are carried on arms 6 and 7. The first ends of which are indicated by reference numerals 8 and 9. These arms 6 and 7 are resiliently hinged together at their second ends 10 and 11 by a resilient hinge 12. Each of the arms 6 and 7 has a finger reception means indicated generally by reference numerals 14 and 15. These are adjacent the masking elements 1 and 2 and each includes a substantially horizontal portion 16, 17 and an upstanding portion 18, 19 so that the masking elements can be pressed onto a supporting surface and moved towards an away from each other against the resilience of the hinge 12 to vary the dimensions of the viewing area 5.

It will be seen that the cross-section of each of the arms 6 and 7 in the region of the finger reception means is substantially "L" shaped. The resilient hinge 12 is formed by an interconnecting extension of the upstanding portions 18, 19.

Figure 2:
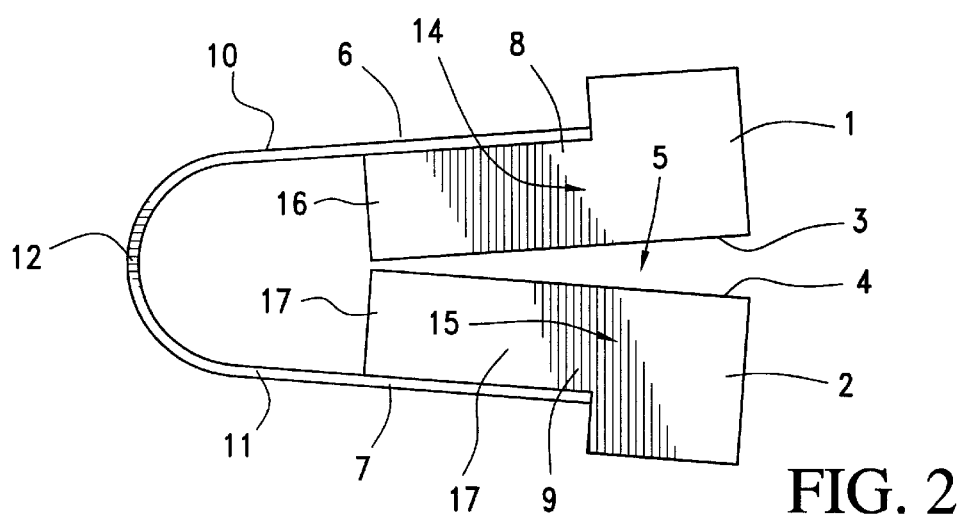
FIG. 2 is a plan view of the device shown in FIG. 1.
Figure 3:
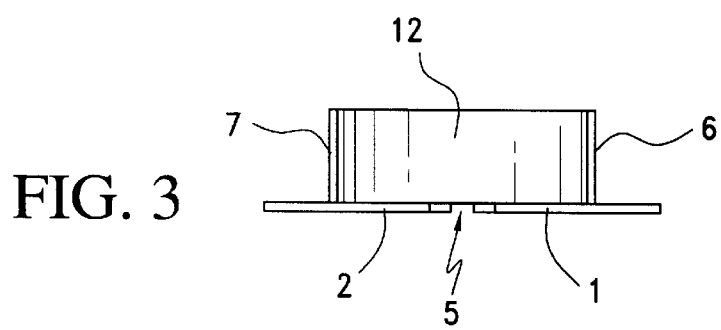
FIG. 3 is an end view of the device shown in FIG. 1.

The device is made from a suitable synthetic plastics material which has a natural resilience. Thus, the hinge 12 has a natural resilience against movement in either direction of the masking elements 1 and 2 but in its formed inoperative position the masking elements are relatively close together, as shown in FIG. 2, and will return to that position when moving pressure is taken from them. In most use therefore the masking elements are moved apart from each other against the resilience of the spring 12, for example, to the position shown in FIG. 4.

Figure 4:
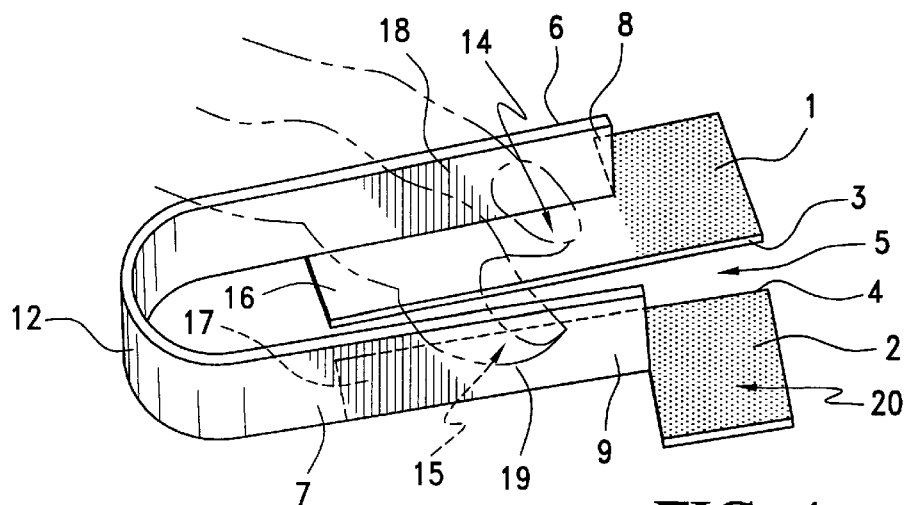
FIG. 4 is an isometric view showing how the device can be used.

In order to operate the device, the teacher places his or her first and second fingers on the finger reception means 14, 15, as shown in FIG. 4, and can easily open and close the masking elements towards and away from each other by moving the fingers apart against the resilience of the hinge 12. The masking elements 1 and 2 are pressed onto the supporting surface which carries the reading matter and the viewing area 5 is varied as required. Because of the finger reception means 14, 15 and their particular shapes, that is, with their substantially horizontal lower portion and upstanding portion provided by the walls of the arms, operation of the device is simple and the teacher's fingers are kept well clear of the masking elements 1 and 2 thus enabling the reader to have a full and unobstructed view of the word or syllable concerned in the viewing area 15.

The masking elements 1 and 2 can be transparent and/or tinted in a suitable colour, this being indicated by reference numeral 20 in FIG. 4. Tinted elements are advantageous when teaching pupils who are dyslexic and who suffer from what is known as dyslexic shimmer.

In order to make the device more attractive to children it can be decorated and/or shaped to represent a natural or fictional character. Thus the creature could be human, animal, fish, insect or alien or imaginary creature.

If this is done the elongate arms can be decorated or shaped to represent the limb or parts of the creature concerned and the masking elements can be decorated and/or shaped to represent the paws or feet at the distal ends of the arms.

Figure 5:
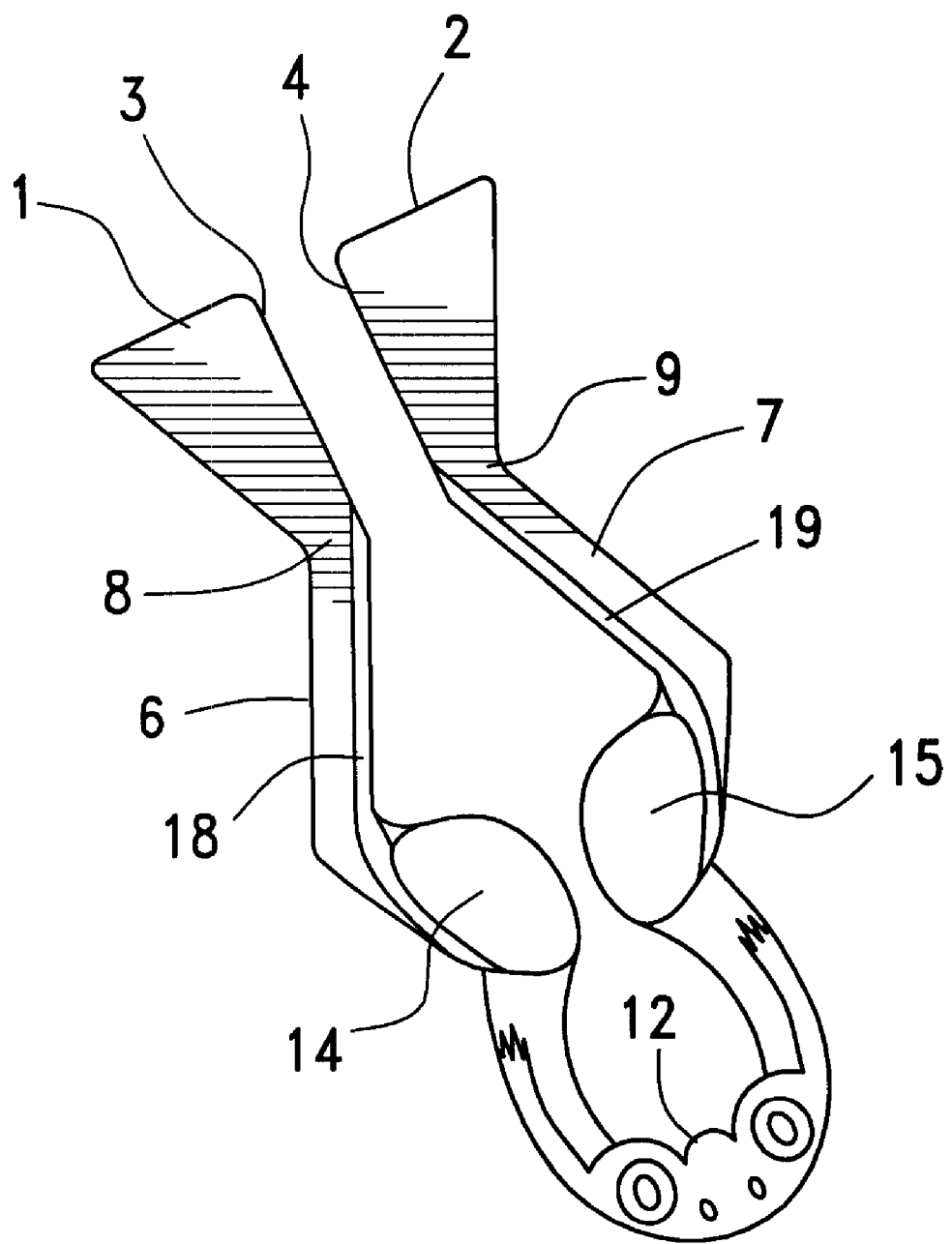
FIG. 5 is a plan view of a construction of the device which is shaped and decorated to represent a frog.

FIG. 5 shows an embodiment of the device which is decorated and shaped to represent a frog. The same reference numerals are used to indicate similar parts and it will be seen that the masking elements 1 and 2 are shaped to represent the frog's front paws or feet and the arms 6 and 7 represent the animals front legs. The animal's head is represented on the hinge portion 12.

If merely decoration is applied to the construction shown in FIGS. 1 to 4 then the marking can be similar but the device will retain its original configuration.

Although a preferred embodiment of the invention has been specifically illustrated and described herein, it is to be understood that minor variations may be made in the apparatus without departing from the spirit and scope of the invention, as defined the appended claims.

What is claimed is:

1. A reading teaching aid comprising two substantially coplanar masking elements which when in use lie against a supporting surface upon which words or syllables are adapted to be localized to enhance readability by a pupil, said substantially coplanar masking elements each including at least one edge collectively setting off between said edges a viewing area, said substantially coplanar masking elements being located one each on respective first ends of a pair of elongated arms which are resiliently hinged together by a resilient hinge at second ends of said elongated arms, and each of said elongated arms having finger reception means adjacent said coplanar masking elements which include a substantially horizontal portion and an adjacent upstanding portion to allow said substantially coplanar masking elements to be pressed onto a supporting surface and moved toward and away from each other by finger forces applied to said upstanding portions and against the resilience of said resilient hinge to thereby selectively vary the distance between said edges and thus the dimensions of the viewing area therebetween.

2. The reading teaching aid as defined in claim 1 wherein said upstanding portions of said finger reception means are disposed in opposing relationship to each other to thereby act as stops to limit the inward movement of the substantially coplanar masking elements and thus prevent overlapping thereof.

3. The reading teaching aid as defined in claim 2 wherein said substantially horizontal portions of the finger reception means are in substantially closely adjacent opposing edge-to edge and side-by-side relationship to each other.

4. The reading teaching aid as defined in claim 2 wherein each of said elongated arms is of a substantially L-shaped vertical cross-section in the area of the finger reception means.

5. The reading teaching aid as defined in claim 1 wherein said substantially horizontal portions of the finger reception means are in substantially closely adjacent opposing edge-to-edge and side-by-side relationship to each other.

6. The reading teaching aid as defined in claim 5 wherein said resilient hinge is formed by an interconnecting extension of said adjacent upstanding portions of said elongated arms.

7. The reading teaching aid as defined in claim 5 wherein each of said elongated arms is of a substantially L-shaped vertical cross-section in the area of the finger reception means.

8. The reading teaching aid as defined in claim 1 wherein each of said elongated arms is of a substantially L-shaped vertical cross-section in the area of the finger reception means.

9. The reading teaching aid as defined in claim 1 wherein each of said substantially coplanar masking elements is substantially of a polygonal shape in plan view.

10. The reading teaching aid as defined in claim 1 wherein said substantially coplanar masking elements are one of opaque or tinted.

11. The reading teaching aid as defined in claim 1 wherein said pair of elongated arms are one of decorated and shaped to represent one of a natural and fictional character.

12. The reading teaching aid as defined in claim 11 wherein said elongated arms are one of decorated and shaped to represent one of limbs and parts of one of natural and fictional characters.

13. The reading teaching aid as defined in claim 12 wherein the substantially coplanar masking elements are one of decorated and shaped to represent one of paws and feet at a distal end of each of said pair of elongated arms.

14. The reading teaching aid as defined in claim 12 wherein the fictional character is one of a human, animal, fish, alien and an imaginary creature.

15. The reading teaching aid as defined in claim 11 wherein the substantially coplanar masking elements are one of decorated and shaped to represent one of paws and feet at a distal end of each of said pair of elongated arms.

16. The reading teaching aid as defined in claim 15 wherein the fictional character is one of a human, animal, fish, alien and an imaginary creature.

17. The reading teaching aid as defined in claim 11 wherein the fictional character is one of a human, animal, fish, alien and an imaginary creature.

* * * * *